US010038562B2

(12) United States Patent
Gajek et al.

(10) Patent No.: US 10,038,562 B2
(45) Date of Patent: Jul. 31, 2018

(54) METHOD AND SYSTEM FOR PROVIDING ENCRYPTED DATA FOR SEARCHING OF INFORMATION THEREIN AND A METHOD AND SYSTEM FOR SEARCHING OF INFORMATION ON ENCRYPTED DATA

(71) Applicant: NEC EUROPE LTD., Heidelberg (DE)

(72) Inventors: Sebastian Gajek, Flensburg (DE); Oezguer Dagdelen, Bensheim (DE)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 14/761,331

(22) PCT Filed: Jan. 29, 2014

(86) PCT No.: PCT/EP2014/051719
§ 371 (c)(1),
(2) Date: Jul. 16, 2015

(87) PCT Pub. No.: WO2014/118230
PCT Pub. Date: Aug. 7, 2014

(65) Prior Publication Data
US 2015/0365239 A1 Dec. 17, 2015

(30) Foreign Application Priority Data

Jan. 29, 2013 (EP) .................................... 13153001

(51) Int. Cl.
*H04L 9/08* (2006.01)
*H04L 9/32* (2006.01)
(Continued)

(52) U.S. Cl.
CPC ............ *H04L 9/3263* (2013.01); *H04L 9/008* (2013.01); *H04L 9/0838* (2013.01); *H04L 9/3093* (2013.01)

(58) Field of Classification Search
CPC ..... H04L 9/3263; H04L 9/008; H04L 9/0838; H04L 9/3093
See application file for complete search history.

(56) References Cited

U.S. PATENT DOCUMENTS 8,291,237 B2 * 10/2012 Ostrovsky ......... G06F 17/30516
707/705
8,515,058 B1 * 8/2013 Gentry .................... H04L 9/008
380/28

(Continued)

OTHER PUBLICATIONS

Adriana Lopez-Alt, et al.: "On-the-fly multiparty computation on the cloud via multikey fully homomorphic encryption", Proceedings of the $44^{TH}$ Symposium on Theory of Computing, STOC #12, Jan. 1, 2012 (Jan. 1, 2012), p. 1219, XP055125512.

(Continued)

*Primary Examiner* — Sharon Lynch
(74) *Attorney, Agent, or Firm* — Leydig, Voit & Mayer, Ltd

(57) ABSTRACT

A method for providing encrypted data for searching of information includes generating a number of distinct key triples each comprising a public key, a corresponding secret key, and a corresponding evaluation key based on searchable information and files to be searched. Information indicating whether the searchable information is included within the files is encrypted with a key of the generated key triples. The secret keys are merged to obtain a single secret key for an entirety of the searchable information within respective ones of the files for each of the files. The encrypted information is provided with the merged secret keys for each of the files as encrypted data for searching of information within the files. The generating of the distinct key triples and the encrypting of the information are performed based on a multikey homomorphic encryption scheme.

14 Claims, 1 Drawing Sheet

(51) Int. Cl.
*H04L 9/00* (2006.01)
*H04L 9/30* (2006.01)

(56) References Cited

U.S. PATENT DOCUMENTS

| | | | | |
|---|---|---|---|---|
| 8,630,422 | B2* | 1/2014 | Gentry | H04L 9/0822 |
| | | | | 380/281 |
| 9,621,346 | B2* | 4/2017 | Gentry | H04L 9/16 |
| 9,716,590 | B2* | 7/2017 | Gentry | H04L 9/28 |
| 9,742,566 | B2* | 8/2017 | Gentry | H04L 9/16 |
| 2005/0008152 | A1* | 1/2005 | MacKenzie | H04L 9/3013 |
| | | | | 380/44 |
| 2010/0146299 | A1 | 6/2010 | Swaminathan et al. | |
| 2011/0110525 | A1* | 5/2011 | Gentry | H04L 9/0822 |
| | | | | 380/285 |
| 2013/0170640 | A1* | 7/2013 | Gentry | H04L 9/008 |
| | | | | 380/30 |
| 2013/0173917 | A1* | 7/2013 | Clifton | G06F 21/6227 |
| | | | | 713/167 |
| 2013/0216044 | A1* | 8/2013 | Gentry | H04L 9/008 |
| | | | | 380/277 |

OTHER PUBLICATIONS

Giuseppe Ateniese, et al: " Entangled Cloud Storage", International Association for Cryptologic Research, vol. 20121004:150200, Oct. 4, 2012 (Oct. 4, 2012), pp. 1-26, XP061006810.

Adriana Lopez-Alt, et al: "Cloud-Assisted Multiparty Computation from Fully Homomorphic Encryption", International Association for Cryptologic Research, vol. 20111209:210406, Dec. 7, 2011 (Dec. 7, 2011), pp. 1-46, XP061005578.

Julien Bringer et al: "Faster secure computation for biometric indentification using filtering", Biometrics (ICB), 2012 $5^{TH}$ IAPR International Conference on, IEEE, Mar. 29, 2012 (Mar. 29, 2012), pp. 257-264, XP032215584.

* cited by examiner

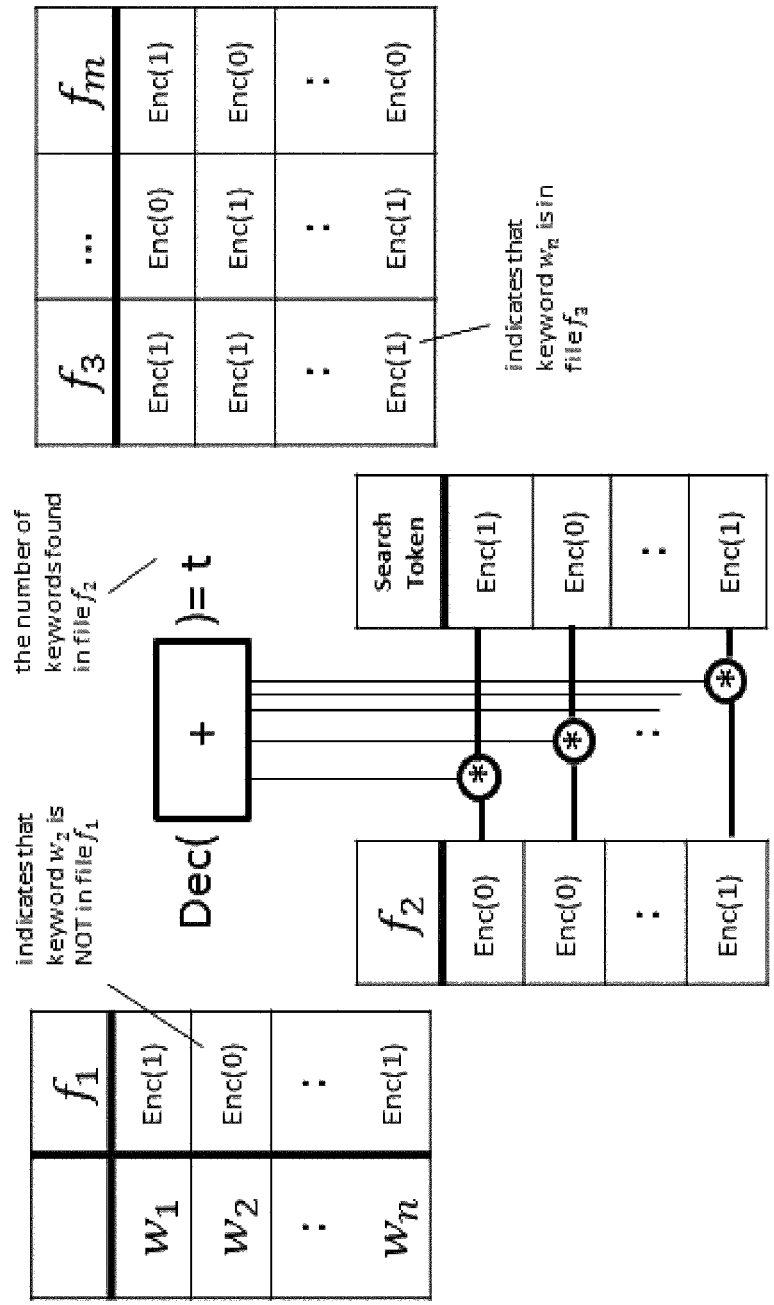

METHOD AND SYSTEM FOR PROVIDING ENCRYPTED DATA FOR SEARCHING OF INFORMATION THEREIN AND A METHOD AND SYSTEM FOR SEARCHING OF INFORMATION ON ENCRYPTED DATA

CROSS-REFERENCE TO PRIOR APPLICATIONS

This application is a U.S. National Phase application under 35 U.S.C. § 371 of International Application No. PCT/EP2014/051719, filed on Jan. 29, 2014, and claims benefit to European Patent Application No. EP 13153001.6, filed on Jan. 29, 2013. The International Application was published in English on Aug. 7, 2014 as WO 2014/118230 under PCT Article 21 (2).

FIELD

The present invention relates to a system and a method for providing encrypted data for searching of information therein.

BACKGROUND

In recent years cloud computing, in particular the provision of external storage has gained more and more importance. Users can make use of these external storages, for example in the so-called clouds, to store their files. In particular if a very large amount of data needs to be maintained and distributed internally in a company, many companies prefer the cheaper solution of outsourcing data into a cloud. To ensure privacy all the files transmitted to the cloud have to be encrypted.

However, if a user likes to search for data or information satisfying certain criteria a usual search on data cannot be applied since searching on encrypted data is impossible for regular encryption schemes. Therefore the so-called searchable encryption schemes SE have been proposed to overcome this problem and allow users to encrypt data and search afterwards on this data for instance for a keyword within the encrypted file without having to decrypt the file.

However one of the drawbacks of conventional searchable encryption schemes is that they are only concerning about data privacy only. Therefore for example search information could be leaked: If the client uses a conventional searchable encryption scheme the corresponding server in the cloud is enabled to read the encrypted data since the files are all encrypted. Such a conventional searchable encryption scheme, a multikey homomorphic bit encryption scheme, is disclosed in the non-patent literature of Adriana López-Alt, Eran Tromer and Vinod Vaikuntanathan, "On-the-fly multiparty computation on the cloud via multikey fully homomorphic encryption", in: proc. STOC 2012, 1219-1234, ACM, 2012, comprising:

- The key generation algorithm KeyGen on input a security parameter n outputs a secret key SK, a public key PK, and an evaluation key EVK.
- The encryption algorithm Enc on input a public key PK and a message m, outputs a ciphertext c.
- The decryption algorithm Dec on input secret keys $SK\_1, \ldots, SK\_k$ and ciphertext c outputs a message m'.
- The evaluation algorithm Eval on input a boolean circuit C, and triples $(c\_1, PK\_1, EVK\_1), \ldots, (c\_k, PK\_k, EVK\_k)$, outputs a ciphertext c* which encrypts the message when the circuit C is applied on the messages within the ciphertexts $c\_1, \ldots, c\_k$.

When a user then searches for a keyword in the encrypted database he can receive all the files containing the respective keywords. However the search pattern is leaked to the server. The server does not learn the keyword itself but the search pattern. In particular the server can extract the information how often the user searched for a specific keyword and when it happened.

Although a knowledge of a search pattern enables a server only in an indirect way to draw conclusions to a certain extent on the content or type of file on the encrypted user data, it is often enough to obtain relevant personal data: For instance if the search queries the keyword "Oncologist" in the encrypted user data, one can easily reveal that the user suffers from cancer disease.

SUMMARY

In an embodiment, the present invention provides a method for providing encrypted data for searching of information. A number of distinct key triples each comprising a public key, a corresponding secret key, and a corresponding evaluation key are generated based on one or more searchable information and on one or more files to be searched. Information indicating whether or not the one or more searchable information is included within the one or more of the files is encrypted with a key of the generated key triples. The secret keys are merged to obtain a single secret key for an entirety of the one or more searchable information within respective ones of the files for each of the one or more files. The encrypted information is provided with the merged secret keys for each of the one or more files as encrypted data for searching of information within the one or more files. The generating of the distinct key triples and the encrypting of the information are performed based on a multikey homomorphic encryption scheme.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 shows steps of a method for searching of information and encrypted data according to an embodiment of the present invention.

DETAILED DESCRIPTION

According to an embodiment of the present invention, searchable encryption enables keeping the search words private.

According to an embodiment, the present invention further provides a method and a system enabling an efficient search of the queries respecting privacy.

According to an embodiment, the present invention even further provides a method and a system being secure against quantum attacks and provide long-term security.

According to an embodiment, the present invention even further provides a method and a system reducing the interaction with a client for formulating the search query.

According to an embodiment, a method for providing encrypted data for searching of information therein is defined.

According to an embodiment, the encryption method is characterized by the steps of
a) Generating a number of distinct key triples each comprising a public key, a corresponding secret key and a corresponding evaluation key being dependent on one or more searchable information and being dependent on one or more files on which a search may be performed,
b) Encrypting the information indicating whether or not the one or more searchable information is included in one or more of the files with a key of the generated key triples,
c) Merging the one or more secret keys to obtain a single secret key for all searchable information within a file for each file and
d) Providing the encrypted information with the merged secret keys for each file as encrypted data for searching of information therein,
  wherein at least steps a)-b) are based on a multikey homomorphic encryption scheme.

According to an embodiment, a method for searching of information on encrypted data, encrypted with the method above, is defined.

According to an embodiment, the method is characterized by the steps of
a) Determining one or more information to be searched,
b) Encrypting the determined one or more information using a public key of a key triple generated by performing step a) of the encryption method above and not being used for step b) of the encryption method above,
c) Evaluating the encrypted data of step d) of the encryption method above with the encrypted one or more information for each file,
d) Evaluating—for each file—the result of step c) for all determined information to be searched,
e) Proving—for each file—that the evaluation according to step d) is correctly computed,
f) Decrypting—for each file—the evaluated result of step d) with the merged secret key for the corresponding file and
g) Identifying the files comprising the determined information to be searched based on the proved evaluation according to step e),
wherein at least steps c)-f) are based on a multikey homomorphic encryption scheme and wherein at least step e) is based on a non-interactive proof scheme.

According to an embodiment, a system for providing encrypted data for searching of information therein is defined.

According to an embodiment, the system is characterized by
  a key generation device operable to generate a number of distinct key triples based on a multikey homomorphic encryption scheme each comprising a public key, a corresponding secret key and a corresponding evaluation key being dependent on one or more searchable information and being dependent on one or more files on which a search may be performed,
  an encrypting device operable to encrypt the information indicating whether or not the one or more searchable information is included in one or more of the files with a key of the generated key triples based on a multikey homomorphic encryption scheme,
  a merging device operable to merge the one or more secret keys to obtain a single secret key for all searchable information within a file for each file and a provision device operable to provide the encrypted information with the merged secret keys for each file as encrypted data for searching of information therein.

According to an embodiment, a system for searching of information on encrypted data is defined.

According to an embodiment, the system is characterized by
  a determining device operable to determine one or more information to be searched,
  an encryption device operable to encrypt the determined one or more information using a public key of a key triple generated by performing step a) of the encryption method above and not being used for step b) of the encryption method above,
  a first evaluation device operable to evaluate the encrypted data of step d) of the encryption method above with the encrypted one or more information for each file using a multikey homomorphic encryption scheme,
  a second evaluation device operable to evaluate—for each file—the result of the first evaluation device for all determined information to be searched using a multikey homomorphic encryption scheme,
  a proving device operable to prove—for each file—that the evaluation provided by the second evaluation device is correctly computed based on a non-interactive proof scheme,
  a decryption device operable to decrypt—for each file—the evaluated result of the second evaluation device with the merged secret key for the corresponding file using a multikey homomorphic encryption scheme and
  an identification device operable to identify the files comprising the determined information to be searched based on the proved evaluation provided by the proving device According to an embodiment of the invention, it has been recognized that searches can be kept private. In particular a repetition of searching the same query does not reveal that it is the same query.

According to an embodiment of the invention, it has been further recognized that the methods and systems are efficient, in particular enabling efficient searches of queries of low-degree polynomials including AND, OR, WILDCARD, GREATER THAN, SMALLER THAN and/or EQUAL TO.

According to an embodiment of the invention, it has been even further recognized that security against quantum attacks and long-term security is enabled.

In other words, the embodiments of the present invention uses, based on a multikey homomorphic encryption scheme, the homomorphic properties of multikey homomorphic encryption not only on encrypted (client) data but also on the keys, preferably by using merged secret keys, such that one cannot recover the single keys when the merged key is known. In addition, for decryption knowledge of the merged key is sufficient. The use of the non-interactive proof scheme enables that for proving no interaction, e.g. between a client and a server, is necessary, although proving ensures that the evaluation was correctly performed. In other words, proving ensures that the server correctly computed the homomorphic evaluation of the search procedure.

According to a preferred embodiment, the number of generated key triples is equal to the sum of the number of files, the number of searchable information and a number of functional information, preferably in form of a Boolean circuit. This enables to provide only the number of key triples which are required to encrypt the linking between files and searchable information, i.e. if a searchable information is included in a file.

According to a further preferred embodiment, step a) of the encryption method is performed by performing n times, wherein n equals the number of searchable information, the following steps:
a1) sampling a random key, preferably by use of a pseudo-random function and
a2) a key triple generation procedure, resulting in the number of distinct key triples being dependent on one or more searchable information and being dependent on one or more files on which a search may be performed.

This enables to provide the keys of the key triples with "more" randomness enhancing "hardness" of the generated keys.

According to a further preferred embodiment, step a) of the encryption method is performed by
a3) sampling a random key, preferably by use of a pseudo-random function,
a4) performing a pseudo-random function with input parameters comprising a searchable information, a file to be searched and the sampled security parameter for each file and each searchable information,
a5) setting each of the results of step a4) as a secret key,
a6) computing the corresponding public keys and evaluation keys to obtain distinct key triples.

This enables to generate the secret key first and based on the generated secret keys the remaining key, i.e. the public key and the evaluation key can be (re)computed easily if needed.

According to a further preferred embodiment, only the random key is stored after generation of the distinct key triples. This saves storage resources since—if sufficient computational power can be provided—the key triples can be (re)generated on demand/request using the random key as the master key providing randomness.

According to a further preferred embodiment, for step b) of the encryption method, a matrix structure is used, wherein the rows are used for the searchable information and the columns are used for the files or vice versa. This enables to provide in an efficient way which file comprises which searchable information and further enables an efficient and easy encryption.

According to a further preferred embodiment, the information indicating whether or not the one or more searchable information is included in the one or more files is provided in form of a bit value. This enables to indicate in a very efficient way if in a file a searchable information are included. For example a value of "0" may indicate that a certain searchable information is not included in a certain file whereas the value "1" may indicate, that the certain searchable information is included in a file.

According to a further preferred embodiment, each entry in the matrix structure in step b) of the encryption method is encrypted with the corresponding public key. This enables providing in an efficient way encrypted information indicating whether the one or more searchable information is included in one or more files so that the matrix structure is completely encrypted.

According to a further preferred embodiment, a glossary for the one or more files is generated, on which the one or more searchable information is based, preferably wherein in the glossary relevant information is identified and used as searchable information. This enables an easy and flexible provision of the one or more searchable data, so that in particular only relevant information is used as searchable information According to a further preferred embodiment, part of the encrypted data is replaced, deleted and/or further encrypted data is added without reencryption of the non-altered encrypted data upon request. This enhances greatly flexibility, since encrypted data can be easily modified without having to decrypt, alter and reencrypt all data and data may be tagged with additional tags or tags can be removed. Further efficiency is enhanced since only few computational resources are needed for a modification on the encrypted data.

According to a further preferred embodiment, for performing step b) of the encryption method, a vector structure, preferably a binary vector structure is used with a length corresponding to the number of searchable information. This allows for example for a client to provide a structure in order to search for the searchable information, for example keywords. If a binary structure is used then an efficient and easy provision of a structure for encryption is provided. A binary structure is in particular efficient, since only a "0" and a "1" are used indicating if the client searches for a keyword, i.e. value set to "1", or "0", i.e. indicating that the client does not search for the respective keyword.

According to a further preferred embodiment, step c) of the encryption method is based on a multiplication of a matrix structure, wherein the rows include entries of searchable information and the columns include entries for the files or vice versa with the vector structure. This enables to perform efficiently step c), since for example a multiplication of the matrix with the vector is parallizable.

In FIG. 1,
a search phase for keywords is depicted. In more detail FIG. 1 depicts a server checking how many keywords file f2 comprises for which a client searches for. This is repeated for all files f1-fm. The server can only decrypt the final result for each file f1, . . . , fm.

To prepare the data on which a search is to be performed, the client generates a random key K through a pseudo-random generator. Searchable information, here provided in form of keywords w1, . . . , wn is to be searched for in a plurality of files f1, . . . , fm. In other words a glossary for each of the files is prepared indicating a certain amount of keywords. These keywords are then provided with an indication in which of the files they are included. Therefore the keywords are linked with the files.

To provide encryption for this "linking" the client performs in a first step n times the key generation algorithm outputting $1 \leftarrow i \leftarrow n*m+1$ distinct key tuples (SKi, PKi, EVKi), wherein SK indicates a secret key, PK indicates a public key and EVK an evaluation key. The secret key, the public key and the evaluation key SKi, PKi, EVKi are generated based on a multi-key homomorphic encryption scheme, comprising a key generation algorithm, wherein the key generation algorithm on input of a security parameter outputs a secret key SK, public key PK and an evaluation key EVK, an evaluation algorithm, wherein the evaluation algorithm on input of a Boolean circuit and triples of values of the Boolean circuit, public key and evaluation key (c_1, PK_1, EVK_1), . . . , (c_k, PK_k, EVK_k), outputs ciphertext c* encrypting information when the Boolean circuit is applied on the messages within the cipher texts c1, . . . , ck, an encryption algorithm, wherein the encryption algorithm outputs a ciphertext c on input of a public key PK and a message M and a decryption algorithm, wherein the decryption algorithm outputs a message M' on input of secret keys SK1, . . . , SKk and ciphertext c.

Alternatively, according to the multikey-homomorphic encryption scheme, the client may set a secret key SK[i, j] with $1 \leftarrow i \leftarrow n$, $1 \leftarrow j \leftarrow m$ as an output of a pseudorandom function PRF with input parameters of the i-th keyword wi and the j-th file fj under the key K, i.e. SK[i, j]=PRF (K, wi || fj). The remaining keys to be generated, i.e. the public key PK[i, j] and the evaluation EVK[i, j] can be computed based on the secret key SK[i, j] with the key generation algorithm according to the multikey homomorphic encryption scheme. The client only needs to store the random key K, if for example storage resources are limited. On request or when needed based in the indices (i, j) and the random key K the pseudo-random function can (re)generate all key triples.

The client then prepares and n×m matrix M where the keywords w1, . . . , wn label the rows and the files f1, . . . , fm label the columns. The entry in position (i, j) in the matrix M is set to 1 only if the file fj comprises the keyword wi, otherwise the value is set to 0. Now all entries whether 0 or 1 are encrypted using a multikey homomorphic encryption scheme, in particular the client encrypts the entry (i, j) of the matrix M with the public key PK[i, j]. Therefore the information if a certain keyword wi is included in a certain file fj is now available encrypted.

The client merges now the secret SK[1, j], . . . SK[n+1, j] to obtain SK*[j] for all j←m. Merging may be performed for example by adding or multiplication of the secret keys: SK[2]*=SK[1, 2]+ . . . +SK[n+1, 2] for the file f2. The merging is performed in such a way that given the merged key SK*, one cannot recover the single secret keys SK1, . . . , SK[m], but for decryption the knowledge of the merged secret key SK* is sufficient.

The encrypted matrix together with the merged secret keys SK*[1], . . . , SK*[m] is handed over to the server. This encrypted matrix is shown in FIG. 1 wherein for example keyword w1 is included in file f1, so the entry of the matrix M(1, 1) comprises the encrypted value of 1: Enc(1).

For searching for the keywords w1, . . . , wn the client C prepares preferably a binary vector T[i] of length n depending on the overall number of keywords. To search for a specific keyword within the set of all keywords, the value T[i] is set to 1 if the client C searches for the keyword wi and 0 otherwise. The vector T is then component-wise encrypted by the client using the public key PKn+1. The client C then sends the entire encrypted vector T to the server.

The server then performs for all columns j=1, . . . , m, i.e. for all files f1, . . . , fm, the following: M(i, j) indicates the encrypted value in the matrix M in the position (i, j). For the jth column, a value vi is set to vi=M(i, j)*T[i], wherein for the multiplication the evaluation algorithm of the multikey homomorphic encryption scheme is used and performed for all i, i.e. for all keywords wi. For example in the second column j=2, v1 is M(1, 2)*T[1], v2 is M(2, 2)*T[2], etc.

After obtaining the values v1, . . . , vn, the client C computes the sum of all vi by performing the evaluation algorithm according to the multikey homomorphic encryption scheme: The client then obtains for the j-th column $\Sigma_{i=1}^{n}$ M (i,j)·T[i] by performing the evaluation algorithm for the multiplication of M(i, j) with T(i) and using the evaluation algorithm to obtain the sum of the product. The evaluation algorithm ensures that the server has to use the correct operation provided by the client via the encrypted matrix and the merged secret keys. Otherwise the server cannot decrypt the information above correctly:

The server can now decrypt v by using the corresponding merged secret key SK*[j] for the corresponding file fj: If the output is 1 then the server knows that the file fj fulfills the search criteria: M(i, j)*T[i] has the value 1 only if M[i, j] encrypts the value 1, i.e. the keyword wi is in the file fj and T[i] encrypts the value 1, i.e. the client searches for the keyword wi. After going over all columns j, i.e. all files the server identifies all files f1, . . . , fm, preferably by identifying pointers to these files, comprising the keywords searched for. The server sends back the corresponding encrypted files comprising one or more of the keywords to the client.

In FIG. 1, for the file f2 the server checks how many keywords the file f2 comprises for which the client searches for. For example in the first row the file f2 comprises the encoded value of 0, wherein the search token has the encrypted value of 1 but in the second row the encrypted value in file f2 is 0 and the search token has also the encrypted value of 0. Therefore the server knows that keyword w2 is searched but is not included in file f2. In the last row in file f2 the keyword wn is included since file f2 comprises the encoded value of 1 in row n. When checking with a search token the server identifies in the second file f2 that keyword wn is included in file f2.

To summarize all operations are performed on encrypted data so that the server cannot learn the keywords w1, . . . , wn the client C was searching for. The server only learns the result of every file f1, . . . , fm. The merged secret keys SK* cannot be used by the server to decrypt the intermediary values. Further the server cannot behave maliciously by taking encryptions of wrong entries as all entries in the matrix are encrypted under a different key.

The merge algorithm converts an input of secret keys SK1, . . . , SKk by conversion into a single secret key SK* such that one cannot recover SK1, . . . , SKk when SK* is given. For decryption the knowledge of the SK* is sufficient. When searching for decrypted data in a remote server, the server sends its encrypted files plus some auxiliary data to a server enabling and facilitating the search process, i.e. a client. Afterwards, whenever a user searches for data in the database, the server replies with a set of encrypted files satisfying the search requirements. The evaluation algorithm together with the merging algorithm based in the multikey homomorphic encryption scheme ensures that the server is "forced" to perform an operation on the encrypted data intended by a client providing the encrypted data.

In summary, the present invention enables hiding of a query pattern while at the same time only a single search query is sent, wherein no interaction is required with the client. Conventional searchable encryption schemes either reveal the search pattern or require interaction with the client to formulate a search query. The present invention keeps the search words private. In particular a repetition of searching the same query does not reveal that it is the same query.

The present invention further enables efficient searches of queries of low-degree polynomials including AND, OR, WILDCARD, GREATER THAN, SMALLER THAN, EQUAL TO. Further the present invention enhances efficiency as it requires in particular only multiplication and addition. Even further due to the matrix structure of the search structure parallel execution can be performed on different entities enhancing efficiency and speed. Further security is enhanced since the present invention is secure against quantum attacks and thus, provides long-term security.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method, performed by a client, for providing encrypted data to a server for searching of information, the method comprising:
   generating a number of distinct key triples each comprising a public key, a corresponding secret key, and a corresponding evaluation key based on one or more searchable information and on one or more files to be searched, wherein the number of generated key triples is equal to a sum of a number of files, a number of searchable information, and a number of functional information and each key triple is generated by performing the following:
   sampling a random key,
   performing a pseudo-random function with input parameters comprising one of the one or more searchable information, one of the one or more files to be searched, and a sampled security parameter for each of the one or more files and for each of the one or more searchable information, setting each result of the pseudo-random function as the corresponding secret key, and
   computing the corresponding public keys and the corresponding evaluation keys to obtain the distinct key triples;
   encrypting information indicating whether or not the one or more searchable information is included within the one or more of the files with a key of the generated key triples;
   merging the secret keys of the distinct key triples to obtain a single secret key for an entirety of the one or more searchable information within respective ones of the files for each of the one or more files; and
   providing, to the server, the encrypted information with the merged secret keys for each of the one or more files as encrypted data for the searching of information within the one or more files such that results of the searching are viewable by the server without revealing the one or more searchable information to the server,
   wherein generating the distinct key triples and encrypting the information are performed based on a multikey homomorphic encryption scheme.

2. The method according to claim 1, wherein only the random key is stored after generating the distinct key triples.

3. The method according to claim 1, wherein a matrix structure is used for encrypting the one or more searchable information, and wherein the rows are used for the one or more searchable information and the columns are used for the one or more files, or the rows are used for the one or more files and the columns are used for the one or more searchable information.

4. The method according to claim 3, wherein each entry in the matrix structure is encrypted with the corresponding public key.

5. The method according to claim 1, wherein the encrypted information indicating whether or not the one or more searchable information is included in the one or more of the files in a form of a bit value.

6. The method according to claim 1, further comprising generating a glossary for the one or more files, wherein relevant information is identified in the glossary and used as the one or more searchable information.

7. The method according to claim 1, wherein, upon request, part of the encrypted data is replaced or deleted, or additional encrypted data is added, without reencryption of non-altered encrypted data.

8. A method for searching of information on the encrypted data provided according to claim 1, comprising:
   determining one or more information to be searched;
   encrypting the determined one or more information using the public key of a key triple from the distinct key triples;
   evaluating the encrypted data comprising the secret keys of the distinct triples merged as the single secret key with the encrypted one or more information for each of the one or more files;
   evaluating, for each of the one or more files, a result of merging the secret keys as the single secret key for the determined one or more information to be searched;
   proving, for each of the one or more files, that the result of merging the secret keys as the single secret key is correctly computed;
   decrypting, for each of the one or more files, the result of merging the secret keys as the single secret key for the corresponding file; and
   identifying the one or more files comprising the determined information to be searched based on the proved result of merging the secret keys as the single secret key;
   wherein at least the evaluating the encrypted data, evaluating the result of merging the secret keys as the single secret key, proving the result and decrypting the result are based on a multikey homomorphic encryption scheme, and wherein at least the proving that the result of merging the secret keys as the single secret key is correctly computed is based on a non-interactive proof scheme.

9. The method according to claim 8, wherein a vector structure is used in encrypting the determined one or more information using the public key of the key triple, with a length corresponding to a number of the one or more searchable information.

10. The method according to claim 9, wherein evaluating the encrypted data with the merged secret keys is based on a multiplication of a matrix structure with entries in the vector structure, and wherein the rows include entries for the one or more searchable information and the columns include entries for the one or more files, or the rows include entries for the one or more files and the columns include entries for the one or more searchable information.

11. A system for providing a server with encrypted data for searching of information, the system comprising:
    a client having memory and one or more processors, which alone or in combination are configured to provide for performance of the following steps:
    generating a number of distinct key triples based on a multikey homomorphic encryption scheme each comprising a public key, a corresponding secret key and a corresponding evaluation key based on one or more searchable information and on one or more files to be searched, wherein the number of generated key triples is equal to a sum of a number of files, a number of searchable information, and a number of functional information and each key triple is generated by performing the following:
    sampling a random key,
        performing a pseudo-random function with input parameters comprising one of the one or more searchable information, one of the one or more files to be searched, and a sampled security parameter for each of the one or more files and for each of the one or more searchable information, setting each result of the pseudo-random function as the corresponding secret key, and
        computing the corresponding public keys and the corresponding evaluation keys to obtain the distinct key triples;
    encrypting information indicating whether or not the one or more searchable information is included within the one or more of the files with a key of the generated key triples based on the multikey homomorphic encryption scheme;
    merging the secret keys of the distinct key triples to obtain a single secret key for an entirety of the one or more searchable information within respective ones of the one or more files for each of the one or more files; and
    providing, to the server, the encrypted information with the merged secret keys for each of the one or more files as encrypted data for the searching of information within the one or more files such that results of the search are viewable by the server without revealing the one or more searchable information to the server.

12. A system for searching of information on the encrypted data provided according to claim 11, the system comprising:
    the server having memory and one or more processors, which alone or in combination are configured to provide for performance of the following steps:
    determining one or more information to be searched;
    encrypting the determined one or more information using the public key of a key triple from the distinct key triples;
    evaluating the encrypted data comprising the secret keys of the distinct triples merged as the single secret key with the encrypted one or more information for each of the one or more files using a multikey homomorphic encryption scheme;
    evaluating, for each of the one or more files, a result of the first evaluation device for an entirety of the determined one or more information to be searched using the multikey homomorphic encryption scheme,
    proving, for each of the one or more files, that the evaluated result provided by the second evaluation device is correctly computed based on a non-interactive proof scheme;
    decrypting, for each of the one or more files, the evaluated result provided by the second evaluation device with the merged secret key for the corresponding file using the multikey homomorphic encryption scheme; and
    identifying the one or more files comprising the determined one or more information to be searched based on the proved evaluated result of merging the secret keys as the single secret key.

13. At least one tangible, non-transitory computer-readable medium having instructions thereon which, when executed by at least one processor, cause the at least one processor to perform the following steps:
    generating a number of distinct key triples each comprising a public key, a corresponding secret key, and a corresponding evaluation key based on one or more searchable information and on one or more files to be searched, wherein the number of generated key triples is equal to a sum of a number of files, a number of searchable information, and a number of functional information and each key triple is generated by performing the following:
    sampling a random key,
        performing a pseudo-random function with input parameters comprising one of the one or more searchable information, one of the one or more files to be searched, and a sampled security parameter for each of the one or more files and for each of the one or more searchable information, setting each result of the pseudo-random function as the corresponding secret key, and
        computing the corresponding public keys and the corresponding evaluation keys to obtain the distinct key triples;
    encrypting information indicating whether or not the one or more searchable information is included within the one or more of the files with a key of the generated key triples;
    merging the secret keys of the distinct key triples to obtain a single secret key for an entirety of the one or more searchable information within respective ones of the files for each of the one or more files; and
    providing, to a server, the encrypted information with the merged secret keys for each of the one or more files as encrypted data for the searching of information within the one or more files such that results of the search are viewable by the server without revealing the one or more searchable information to the server,
    wherein generating the distinct key triples and encrypting the information are performed based on a multikey homomorphic encryption scheme.

14. The non-transitory computer readable medium of claim 13, wherein the at least one processor is further caused to perform:

determining one or more information to be searched;
encrypting the determined one or more information using the public key of a key triple from the distinct key triples;
evaluating the encrypted data comprising the secret keys of the distinct triples merged as the single secret key with the encrypted one or more information for each of the one or more files;
evaluating, for each of the one or more files, a result of merging the secret keys as the single secret key for the determined one or more information to be searched;
proving, for each of the one or more files, that the result of merging the secret keys as the single secret key is correctly computed;
decrypting, for each of the one or more files, the result of merging the secret keys as the single secret key for the corresponding file; and
identifying the one or more files comprising the determined information to be searched based on the proved result of merging the secret keys as the single secret key;
wherein at least the evaluating the encrypted data, evaluating the result of merging the secret keys as the single secret key, proving the result and decrypting the result are based on a multikey homomorphic encryption scheme, and wherein at least the proving that the result of merging the secret keys as the single secret key is correctly computed is based on a non-interactive proof scheme.

* * * * *